United States Patent

Hoyle et al.

[15] 3,635,070
[45] Jan. 18, 1972

[54] METHOD OF WORKING CELLULAR MATERIAL

[72] Inventors: John Hoyle; Derek Aspden, both of Clitheroe, England

[73] Assignee: Rolls Royce Limited, Derby, England

[22] Filed: Jan. 16, 1970

[21] Appl. No.: 3,343

[30] Foreign Application Priority Data

Feb. 22, 1969 Great Britain..........................9666/69

[52] U.S. Cl............................................72/376, 29/156.8 B
[51] Int. Cl. ......................................B21d 31/00, B21k 3/04
[58] Field of Search................72/701, 339, 376; 29/455 LM, 29/423, 424, 156.8 B

[56] References Cited

UNITED STATES PATENTS

| | | | |
|---|---|---|---|
| 2,720,948 | 10/1955 | Pasak | 29/455 |
| 3,225,582 | 12/1965 | Broderick | 29/455 |
| 2,987,806 | 6/1961 | Pekarek | 29/156.8 B |
| 2,644,777 | 7/1953 | Havens | 29/455 |
| 3,056,188 | 10/1962 | Stalker | 29/455 |

Primary Examiner—Charles W. Lanham
Assistant Examiner—R. M. Rogers
Attorney—Cushman, Darby & Cushman

[57] ABSTRACT

A blade for a gas turbine engine has its core made from a honeycomb structure which is shaped externally to suit the internal blade profile. The honeycomb portion is cut to the developed shape of the blade internal profile and then its edges are bent so as to facilitate crushing to final shape, the prebending enabling the honeycomb to be crushed without blocking of the honeycomb pockets with crushed material.

2 Claims, 7 Drawing Figures

PATENTED JAN 18 1972

3,635,070

Inventor
JOHN HOYLE +
DEREK ASPDEN
By
Cushman, Darby & Cushman
Attorneys

METHOD OF WORKING CELLULAR MATERIAL

This invention concerns the working of cellular material.

According to the present invention there is provided a method of shaping a cellular material in which the sides of the finished structure are curved, comprising cutting the material to a developed form of the finished structure, wherein one side thereof is plane and then crushing the developed form between dies so as to produce the required finished structure shape.

Preferably at least one of the sides of the developed form of the material is worked upon to reduce its resistance to crushing.

Preferably the working comprises bending the edges of the walls which define the cells of the cellular structure.

Preferably the finished shaped structure is such as to permit fitting thereof into a hollow member and conforms to the internal shape thereof.

Preferably though not restrictively, the hollow member is a blade of the type used in gas turbine engines.

Alternatively, the cellular structure, when shaped by the method described herein, could be used as a high-strength, low-weight core for the wing or fuselage, of an aircraft or the hull of a boat.

The invention will now be described by way of example only and with reference to the accompanying drawings in which.

Figure 1:
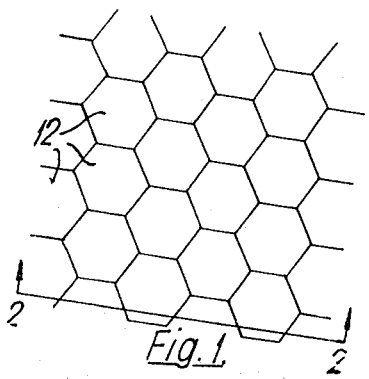
FIG. 1 is a plan view of a honeycomb structure.
Figure 2:
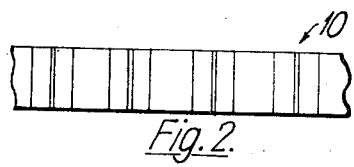
FIG. 2 is a section on line 2—2 of FIG. 1.

In FIGS. 1 and 2 a piece of material 10 which in the present example, could be aluminum or some other lightweight metal, is formed into a honeycomb structure 12. This structure is well known and material formed like this can be obtained ready made in large quantities. However, when material of this form is required to be worked or shaped, difficulty is experienced in holding and locating it, particularly where the finished shape of the structure is curved on all surfaces.

The example described herein provides a structure, the finished shape of which is curved on all surfaces, namely a honeycomb core for an aerofoil blade for use in a gas turbine jet propulsion engine and, in order to obviate the above-mentioned difficulties, the following method has been devised.

Figure 3:
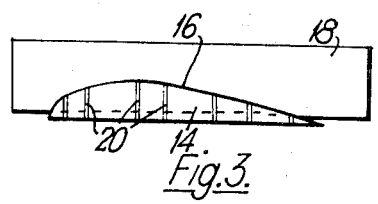
FIG. 3 is a section through a developed, cut structure.
Figure 5:
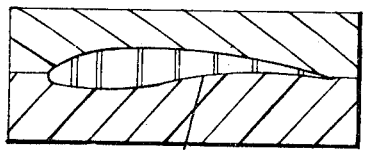
FIG. 5 is a section through a crushed structure.
Figure 6:
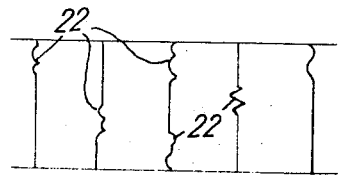
FIG. 6 is a further section through a crushed structure the edges of which have not been bent before crushing.
Figure 7:
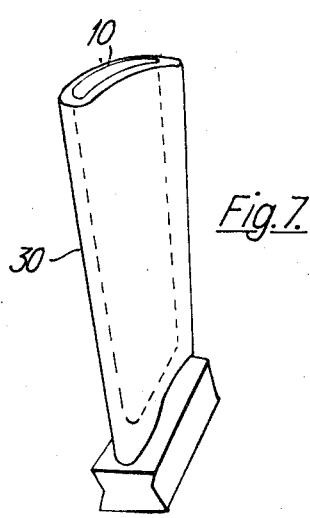
FIG. 7 is a pictorial view of an application for the crushed structure.

One of the curved surfaces 14 of the blade core (see FIG. 5) is developed into a plane surface (FIG. 3). This development provides a surface on which to locate the structure so as to machine the remaining curved surface 16 by conventional means, such as a thin section-spinning disc cutter as is known in the art. After machining the curved surface thus, the structure is laid within a shaped pocket in a support block 18 and the edges 20 of the honeycomb walls which form the plane surface are bent to a depth of approximately ten-thousandths of an inch, so as to reduce their resistance to crushing. The bending of the edges 20 controls the manner in which the honeycomb structure collapses, for it has been found that without the bending operation, the walls collapse in an irregular manner, as shown at 22 in FIG. 6.

Figure 4:
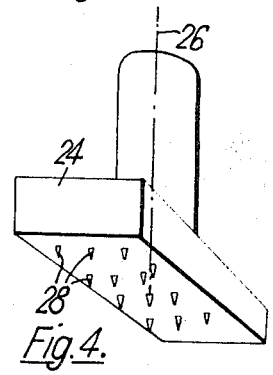
FIG. 4 is a pictorial view of a bending member.

A tool which is suitable for performing the bending operation is shown in FIG. 4 and comprises a block 24 having hard studs 28 or the like protruding from its under surface. The tool is moved in a circular path in a plane coincidental with the plane of surface 14, at the same time traversed across the surface 14 so that studs 28 bend edges 20.

After bending edges 20, the structure is placed between dies and crushed to a shape identical with the internal shape of the blade aerofoil 30, so as to fit therein.

We claim:

1. A method of shaping cellular material in which the sides of the finished structure are curved, the cellular material being of the type having a plurality of walls joined together to form a plurality of cells and with said walls each having a first edge and a second edge spaced substantially perpendicularly from said first edge with said first and second edges defining, respectively, two sides of the cellular material, at least one of said sides being plane, the method comprising the steps of:

bending the edges of the walls of the cells on one of said sides to reduce said walls' resistance to crushing along the portion of the walls extending between their respective first and second edges, and then, crushing the cellular material between curved dies to produce the desired curved shape.

2. The method as claimed in claim 1 wherein the said one side of the material which has its edges bent is the plane side.

* * * * *